United States Patent
Singh et al.

(10) Patent No.: US 10,192,052 B1
(45) Date of Patent: Jan. 29, 2019

(54) SYSTEM, APPARATUS AND METHOD FOR CLASSIFYING A FILE AS MALICIOUS USING STATIC SCANNING

(71) Applicant: FireEye, Inc., Milpitas, CA (US)

(72) Inventors: Abhishek Singh, Milpitas, CA (US); Yichong Lin, Fremont, CA (US); Angshuman Mukherjee, Fremont, CA (US); Zheng Bu, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 469 days.

(21) Appl. No.: 14/042,505

(22) Filed: Sep. 30, 2013

(51) Int. Cl.
*G06F 21/56* (2013.01)

(52) U.S. Cl.
CPC .......... *G06F 21/562* (2013.01); *G06F 21/563* (2013.01); *G06F 21/564* (2013.01); *G06F 21/565* (2013.01); *G06F 21/566* (2013.01)

(58) Field of Classification Search
CPC ................. G06F 21/554; G06F 21/577; G06F 21/562–21/566; H04L 63/1408; H04L 63/1433; H04L 63/20; H04L 63/145
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,269,330 B1 | 7/2001 | Cidon et al. |
| 6,279,113 B1 | 8/2001 | Vaidya |
| 6,298,445 B1 | 10/2001 | Shostack |
| 6,357,008 B1 | 3/2002 | Nachenberg |
| 6,424,627 B1 | 7/2002 | Sorhaug et al. |
| 6,484,315 B1 | 11/2002 | Ziese |

(Continued)

FOREIGN PATENT DOCUMENTS

| | | |
|---|---|---|
| GB | 2439806 | 1/2008 |
| WO | WO-02/06928 | 1/2002 |

(Continued)

OTHER PUBLICATIONS

*IEEE Xplore Digital Library Sear Results for "detection of unknown computer worms".* Http//ieeexplore.ieee.org/searchresult.jsp?SortField=Score&SortOrder=desc&ResultC . . . . (Accessed on Aug. 28, 2009).

(Continued)

*Primary Examiner* — Minh Dinh
*Assistant Examiner* — Shu C Gao
(74) *Attorney, Agent, or Firm* — Rutan & Tucker, LLP (57) ABSTRACT

According to one embodiment, a computerized method comprises conducting a first static scan on content within a file. Thereafter, if the first static scan did not result in the file being classified as malicious, the file is deconstructed to gain access to one or more objects within the file. A second static scan associated with the one or more objects is performed to determine whether the one or more objects are suspected of including malware. The file may then be classified as malicious based on results of the second static scan.

23 Claims, 6 Drawing Sheets

(56) References Cited

U.S. PATENT DOCUMENTS

| | | |
|---|---|---|
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,981,279 B1 | 12/2005 | Arnold et al. |
| 7,007,107 B1 | 2/2006 | Ivchenko et al. |
| 7,028,179 B2 | 4/2006 | Anderson |
| 7,043,757 B2 | 5/2006 | Hoefelmeyer et al. |
| 7,069,316 B1 | 6/2006 | Gryaznov |
| 7,080,408 B1 | 7/2006 | Pak et al. |
| 7,093,002 B2 | 8/2006 | Wolff et al. |
| 7,093,239 B1 | 8/2006 | van der Made |
| 7,100,201 B2 | 8/2006 | Izatt |
| 7,159,149 B2 | 1/2007 | Spiegel et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,287,278 B2 | 10/2007 | Liang |
| 7,308,716 B2 | 12/2007 | Danford et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,475,427 B2 * | 1/2009 | Palliyil et al. .................. 726/24 |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,849,506 B1 | 12/2010 | Dansey et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,996,556 B2 | 8/2011 | Raghavan et al. |
| 7,996,836 B1 | 8/2011 | McCorkendale et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,201,245 B2 * | 6/2012 | Dewey et al. .................. 726/22 |
| 8,201,246 B1 | 6/2012 | Wu et al. |
| 8,204,984 B1 | 6/2012 | Aziz et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,709 B2 | 7/2012 | Viljoen et al. |
| 8,239,944 B1 | 8/2012 | Nachenberg et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,321,942 B1 * | 11/2012 | Chiueh et al. .................. 726/24 |
| 8,365,286 B2 | 1/2013 | Poston |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,479,291 B1 * | 7/2013 | Bodke ............................. 726/23 |
| 8,495,733 B1 * | 7/2013 | Cheng et al. .................. 726/22 |
| 8,510,827 B1 | 8/2013 | Leake et al. |
| 8,510,842 B2 | 8/2013 | Amit et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,713,681 B2 | 4/2014 | Silberman et al. |
| 8,763,125 B1 * | 6/2014 | Feng ............................. 726/24 |
| 8,959,639 B2 * | 2/2015 | Shevchenko ........... G06F 21/56 726/22 |
| 9,087,195 B2 * | 7/2015 | Golovkin ............... G06F 21/563 |
| 9,213,838 B2 * | 12/2015 | Lu .......................... G06F 21/563 |
| 9,672,355 B2 * | 6/2017 | Titonis .................... G06F 21/56 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | Van Der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |

(56) References Cited

U.S. PATENT DOCUMENTS

| | | |
|---|---|---|
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0108562 A1* | 5/2005 | Khazan ............... G06F 11/3604 726/23 |
| 2005/0114663 A1 | 5/2005 | Cornell et al. |
| 2005/0125195 A1 | 6/2005 | Brendel |
| 2005/0157662 A1 | 6/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0261112 A1* | 11/2007 | Todd et al. ..................... 726/11 |
| 2007/0271446 A1 | 11/2007 | Nakamura |
| 2008/0005782 A1 | 1/2008 | Aziz |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1* | 7/2009 | Poston ............................ 726/24 |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115619 A1* | 5/2010 | Burtscher ....................... 726/24 |
| 2010/0115621 A1 | 5/2010 | Staniford et al. |
| 2010/0132038 A1* | 5/2010 | Zaitsev ............................ 726/22 |
| 2010/0154056 A1 | 6/2010 | Smith et al. |
| 2010/0192223 A1 | 7/2010 | Ismael et al. |
| 2010/0250497 A1* | 9/2010 | Redlich ................... F41H 13/00 707/661 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0247072 A1 | 10/2011 | Staniford et al. |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0260342 A1* | 10/2012 | Dube .................... G06F 21/564 726/24 |
| 2012/0266244 A1* | 10/2012 | Green et al. .................. 726/24 |

(56) References Cited

U.S. PATENT DOCUMENTS

| | | | |
|---|---|---|---|
| 2012/0278886 | A1 | 11/2012 | Luna |
| 2012/0297489 | A1 | 11/2012 | Dequevy |
| 2012/0330801 | A1 | 12/2012 | McDougal et al. |
| 2013/0036472 | A1 | 2/2013 | Aziz |
| 2013/0047257 | A1 | 2/2013 | Aziz |
| 2013/0097706 | A1* | 4/2013 | Titonis et al. ............. 726/24 |
| 2013/0117848 | A1* | 5/2013 | Golshan et al. ............ 726/23 |
| 2013/0160127 | A1* | 6/2013 | Jeong ............... G06F 21/566 726/24 |
| 2013/0160130 | A1 | 6/2013 | Mendelev et al. |
| 2013/0160131 | A1 | 6/2013 | Madou et al. |
| 2013/0227636 | A1* | 8/2013 | Bettini ............ H04W 4/001 726/1 |
| 2013/0227691 | A1 | 8/2013 | Aziz et al. |
| 2013/0246370 | A1 | 9/2013 | Bartram et al. |
| 2013/0263260 | A1 | 10/2013 | Mahaffey et al. |
| 2013/0291109 | A1 | 10/2013 | Staniford et al. |
| 2013/0298243 | A1 | 11/2013 | Kumar et al. |
| 2013/0347104 | A1* | 12/2013 | Raber et al. ............... 726/22 |
| 2014/0053260 | A1 | 2/2014 | Gupta et al. |
| 2014/0053261 | A1 | 2/2014 | Gupta et al. |
| 2015/0007312 | A1* | 1/2015 | Pidathala ........... H04L 63/145 726/22 |

FOREIGN PATENT DOCUMENTS

| | | |
|---|---|---|
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | WO-2012/145066 | 10/2012 |

OTHER PUBLICATIONS

*AltaVista Advanced Search Results. "Event Orchestrator".* Http://www.altavista.com/web/results?Itag=ody&pg=aq&aqmode=aqa=Event+Orchesrator . . . , (Accessed on Sep. 3, 2009).

*AltaVista Advanced Search Results. "attack vector identifier".* Http://www.altavista.com/web/results?Itag=ody&pg=aq&aqmode=aqa=Event+Orchestrator . . . , (Accessed on Sep. 15, 2009).

*Cisco, Configuring the Catalyst Switched Port Analyzer (SPAN)* ("*Cisco*"), (1992-2003).

Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("Sailer").

*Excerpt regarding First Printing Date for Merike Kaeo, Designing Network Security*.("Kaeo"), (2005).

*The Sniffers's Guide to Raw Traffic* available at: yuba.stanford.edu/~casado/pcap/section1.html, (Jan. 6, 2014).

*NetBIOS Working Group. Protocol Standard for a NetBIOS Service on a TCP/UDP transport: Concepts and Methods.* STD 19, RFC 1001, Mar. 1987.

"Network Security: NetDetector—Network Intrusion Forensic System (NIFS) Whitepaper", "*NetDetector Whitepaper*"), (2003).

"Packet", *Microsoft Computer Dictionary, Microsoft Press*, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Abdullah, et al., Visualizing Network Data for Intrusion Detection, *2005 IEEE Workshop on Information Assurance and Security*, pp. 100-108.

Adetoye, Adedayo , et al., "Network Intrusion Detection & Response System", ("Adetoye"), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", *J Comput Virol*, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("*Boubalos*"), (Jun. 5, 2003).

Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Cohen, M.I. , "PyFlag—An advanced network forensic framework", *Digital investigation 5* , Elsevier, (2008), pp. S112-S120.

Costa, M. , et al., "Vigilante: End-to-End Containment of Internet Worms", *SOSP '05, Association for Computing Machinery, Inc.*, Brighton U.K., (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , ""Zlib compressed data format specification version 3.3" RFC 1950, (1996)".

Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("*Dunlap*"), (Dec. 9, 2002).

Filiol, Eric , et al., "Combinatorial Optimisation of Worm Propagation on an Unknown Network", International Journal of Computer Science 2.2 (2007).

Goel, et al., Reconstructing System State for Intrusion Analysis, *Apr. 2008 SIGOPS Operating Systems Review*, vol. 42 Issue 3, pp. 21-28.

Hjelmvik, Erik , "Passive Network Security Analysis with NetworkMiner", (*In*)*Secure*, Issue 18, (Oct. 2008), pp. 1-100.

Kaeo, Merike , "Designing Network Security", ("*Kaeo*"), (Nov. 2003).

Kim, H. , et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", ("*King*").

Krasnyansky, Max , et al., Universal TUN/TAP driver, available at https://www.kernel.org/doc/Documentation/networking/tuntap.txt (2002) ("*Krasnyansky*").

Kreibich, C. , et al., "Honeycomb-Creating Intrusion Detection Signatures Using Honeypots", *2nd Workshop on Hot Topics in Networks (HotNets-11)*, Boston, USA, (2003).

Kristoff, J. , "Botnets, Detection and Mitigation: DNS-Based Techniques", *NU Security Day*, (2005), 23 pages.

Liljenstam, Michael , et al., "Simulating Realistic Network Traffic for Worm Warning System Design and Testing", *Institute for Security Technology studies, Dartmouth College*, ("Liljenstam"), (Oct. 27, 2003).

Marchette, David J., "Computer Intrusion Detection and Network Monitoring: A Statistical Viewpoint", ("*Marchette*"), (2001).

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", *INFOCOM*, vol. 3, (Mar. 30-Apr. 3, 2003), pp. 1901-1910.

Morales, Jose A., et al., ""Analyzing and exploiting network behaviors of malware."", *Security and Privacy in Communication Networks*. Springer Berlin Heidelberg, 2010. 20-34.

Natvig, Kurt , "SandBoxII: Internet", *Virus Bulletin Conference*, ("Natvig"), Exhibit 1028, (Sep. 2002).

Newsome, J. , et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).

Newsome, J. , et al., "Polygraph: Automatically Generating Signatures for Polymorphic Worms", *In Proceedings of the IEEE Symposium on Security and Privacy*, (May 2005).

(56) References Cited

OTHER PUBLICATIONS

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual is Better Than Real, Department of Electrical Engineering and Computer Science", *University of Michigan* ("*Chen*").

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", ("*Spizner*"), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

\* cited by examiner

SYSTEM, APPARATUS AND METHOD FOR CLASSIFYING A FILE AS MALICIOUS USING STATIC SCANNING

1. FIELD

Embodiments of the disclosure relate to the field of network security. More specifically, one embodiment of the disclosure relates to a system, apparatus and method for performing static scanning of contents within a file to uncover exploits that are application version specific and/or are associated with non-executable files.

2. GENERAL BACKGROUND

Over the last decade, malicious software (malware) has become a pervasive problem for Internet users. In some situations, malware is an exploit, in the form of a program or other file, which is embedded within downloadable content and designed to adversely influence or attack normal operations of a computer. Examples of different types of exploits may include bots, computer viruses, worms, Trojan horses, spyware, adware, or any other programming that operates within an electronic device (e.g. computer, tablet, smartphone, server, router, wearable technology, or other types of electronics with data processing capability) without permission by the user or an administrator.

For instance, exploits may be present in one or more files infected through any of a variety of attack vectors, where the files are part of network traffic. For instance, as an illustrative example, a file may include an exploit that executes only upon detecting execution of a certain version of an application (e.g. exploit inserted into JavaScript® code that is set to execute only upon detecting Adobe® Reader™ version 9). As another illustrative example, an exploit may be placed within a non-executable file (e.g. JPEG® file), where the exploit is carried into the electronic device undetected by malware detection software. Hence, without a multi-tier static scanning scheme as described below, these types of exploits may not be detected.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to static framework within an electronic device having network connectivity, such as a malware content detection (MCD) system for example, and a corresponding method for statically scanning one or more objects within a file. More specifically, the static framework is configured to deconstruct a file for analysis if a first static scan is unsuccessful in detecting the potential presence of malware. Such deconstruction of the file may comprise decompression, disassembly (e.g. convert executable code into a readable form such as converting object code into assembly language or JavaScript® code), decompilation (e.g. converting executable code into pseudo or native code, converting Flash code into action script code, converting JAVA® Archive "JAR" files into JAVA® files, etc.) and/or other de-obfuscation (e.g. decoding, extracting, decrypting, unpacking, removing any protection mechanisms, or conducting other operations to gain code-level access to embedded objects within the file as code can be assembly code, pseudo code, native code such as "C" or Java used by a developer to build the file or software component in the file). The results of the disassembly and/or decompilation may produce a result substantially similar to the original code (e.g. high percentage of similarity such as greater than about 90%).

After deconstructing the file, one or more static scanning analysis operations may be conducted to determine whether one or more objects within the file may include malware. Two types of static scanning operations include heuristic checks and/or deterministic checks. Herein, the heuristic and/or deterministic checks are generally referred to as "malware checks".

The heuristic checks are static scanning operations conducted to determine the degree of correlation between objects within the file, where the presence or absence of such objects may denote potential malicious activity and the presence of malware. Such scanning comprises rule-based data analysis. For example, a deconstructed Flash file may provide the names of different functions within the file (e.g. "WebConnect( )") and identify one or more parameters passed to that function (e.g. "www.XYZ.com"). A rule adapted to control network connectivity may identify the "WebConnect" pattern as an HTTP request and passed parameters. Where the passed parameter is not a specific parameter (e.g., www.ABC.com) or a known malicious pattern, a malicious event is detected, namely there is a reasonable likelihood that the Flash file has become infected with malware.

The deterministic checks are static scanning operations conducted to determine whether any of the object(s) within or associated with the file includes information that is correlated to (or matches) one or more "malware identifiers", which may include, but are not limited or restricted to exploit patterns, names of vulnerable functions that are known to be susceptible to exploits, and/or malicious patterns (e.g. shell code patterns, Return Oriented Programming "ROP" patterns, heap spray patterns, etc.).

If a deconstructed object still does not provide sufficient accessibility to its code-level structure for static scanning, then the static framework conducts an emulation process to emulate file operations undertaken during processing of that object. In particular, such emulation utilizes Application Programming Interface (API) hooking for controlling what values are input to the object during emulation (e.g. specific version numbers or other return parameters). The information exchanged during the "hooking" operations as well as output data from the object under analysis are statically scanned for malware identifiers. In some embodiments, the scanning may also be conducted against any other behaviors of the deconstructed object observed during the emulation. These static scanning operations supplement dynamic, virtual machine based (VM-based) malware detection.

Exemplary operations of the static framework are described below. Once the file is extracted (e.g., file duplicated from network traffic and received by an electronic device with the static framework), the type of the file is determined. Based upon the file type, static deconstruction logic supporting that file type is invoked. The static deconstruction logic ensures that, as needed during static scanning, the file is decompressed, disassembled, decompiled, and/or de-obfuscated. Decompression, disassembly, decompilation, and/or de-obfuscation of the file is conducted to provide code-level access to embedded objects within the file, and one or more malware checks may be conducted on these objects in efforts to detect known attack types (e.g. malware exploits; malicious patterns such as shell code, heap spray and/or ROP patterns, patterns to indicate the file is a malicious downloader, etc.).

If any of the embedded objects is still inaccessible after operations by the static deconstruction logic, then the static framework invokes emulation logic. The emulation logic is configured to emulate operations associated with the processing of a particular object in context with an emulated computer application. As an optional feature, emulation logic may provide the list of functions and other features on which malware checks can be applied. The malware checks are not limited to shell code detection, ROP detection, detection, suspicious function calls, patterns to indicate that the file is a malicious downloader, or the like.

Figure 1:
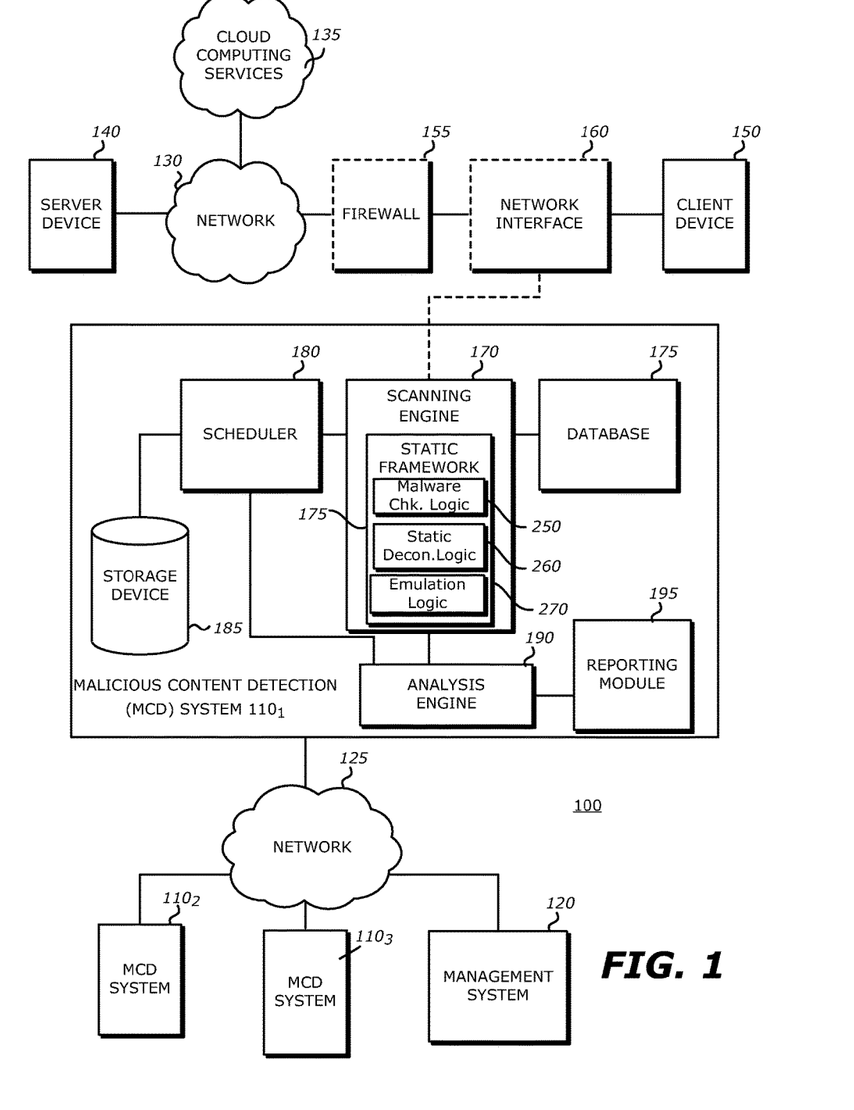
FIG. 1 is an exemplary block diagram of a communication system deploying a plurality of malware content detection (MCD) systems with the framework for static scanning for malware.

According to one embodiment of the disclosure, the static analysis and dynamic analysis performed by scanning engine 170 and analysis engine 190 of FIG. 1 may be performed in sequence in which results of the static analysis may be utilized by a subsequent analysis (e.g., dynamic analysis) to improve the efficiency and accuracy of the subsequent analysis. Alternatively, of course, the static analysis may be conducted concurrently with the dynamic analysis in the same electronic device. In other embodiments, the static analysis (or portions thereof) can take place in the cloud and the results of the static analysis can be shared with the dynamic analysis in the virtual machine (VM). Furthermore, it is contemplated that, when network traffic is received by a network interface device for malware detection, dispatch logic (not shown) may be employed to determine which of the static and dynamic analysis should be performed first, where the dispatch logic is user configurable. For certain types of content (e.g., a Portable Document Format "PDF" file, a Dynamic-Linked Library "DLL", a Flash file, etc.), a static analysis may be performed first and a dynamic analysis may be performed thereafter.

According to one embodiment of the disclosure, in addition to generating a static score (or indicator) that identifies the likelihood of the presence of malware within the analyzed file, scanning engine 170 may further generate information concerning the analyzed file, such as the file type, an operating system and its version of the application in which the file is intended to be executed, and the like. Such content-related information may be utilized by another analysis module to perform a subsequent static analysis specifically tailored to the content in question or may be used during subsequent dynamic analysis.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to one or more software components embedded in or otherwise associated with an executable or non-executable file (e.g. dynamic link library "DLL" or any other resource for storing information), where the software component has a capability of being executed alone or with other software components associated with the same or different files. An example of a type of software component may include, but is not limited or restricted to a function or routine (e.g. a series of code instructions to perform a particular operation), parameters utilized by with the function, or the like. A file having an object that is suspected of including malware may be classified as "malicious".

Herein, there are different degrees of maliciousness. Where there is a first level of likelihood of an object being infected with malware, the file may be classified with a lower "malicious" grade (sometimes referred to as "suspicious"), which may be represented by a score corresponding to the likelihood of malware being present in the file and/or object (e.g., score of 3 out of 10). Where there is a second level of likelihood of an object being infected with malware, the file may be classified with a higher "malicious" grade, normally represented by a higher score (e.g., score of 8 out of 10).

It is contemplated that the file may be transmitted as part of one or more messages associated with network traffic, where each message(s) may be in the form of a packet, a frame, an Asynchronous Transfer Mode "ATM" cell, a data flow (e.g. a group of related messages), or any other series of bits having a prescribed format. For example, the file may be part of network traffic transmitted using a Hypertext Transfer Protocol (HTTP), Hypertext Markup Language (HTML) protocol, or may be transmitted in a manner suitable for display on a Web browser software application.

Another illustrative example is that the file may be transmitted using a particular protocol including, but not limited to an email protocol such as Simple Mail Transfer Protocol (SMTP), Post Office Protocol version 3 (POPS), or Internet Message Access Protocol (IMAP4). Furthermore, the file may be part of an Instant Message, which may be transmitted using Session Initiation Protocol (SIP) or Extensible Messaging and Presence Protocol (XMPP) for example. Yet another illustrative example is that the file may be transferred using a data transfer protocol such as File Transfer Protocol (FTP) for subsequent storage on a file share, Hypertext Transfer (HTTP) protocol and/or Server Message Block (SMB) protocol.

The terms "malware" is directed to software that produces an undesired behavior upon execution, where the behavior is deemed to be "undesired" based on customer-specific rules, manufacturer-based rules, or any other type of rules formulated by public opinion or a particular governmental or commercial entity. This undesired behavior may include a communication-based anomaly or an execution-based anomaly that would (1) alter the functionality of an electronic device executing application software in a malicious manner; (2) alter the functionality of an electronic device executing that application software without any malicious intent; and/or (3) provide an unwanted functionality which may be generally acceptable in another context.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "compare" generally means determining if a match or a certain level of correlation is achieved between two items where one of the items may include the content of a files or a particular identifier.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause one or more malware identifiers, each of which being information representative of prior detected malware, to be shared among some or all of the MCD systems $110_1$-$110_N$ for use in malware checks. Such sharing may be conducted automatically or manually uploaded by an administrator. Also, such sharing may be conducted freely among the MCD systems $110_1$-$110_N$ or subject to a subscription basis.

Herein, according to the embodiment illustrated in FIG. 1, a first MCD system $110_1$ is an electronic device that is adapted to analyze information associated with network traffic routed over a communication network 130 between at least one server device 140 and at least one client device 150. More specifically, the first MCD system $110_1$ is configured to conduct static analysis of information (e.g., a file that is part of message(s) transmitted via the network traffic) received via communication network 130 and, where applicable, classify the file with different "malicious" scores. A file may be classified with a first level (e.g. "suspicious"—assigned a score less than or equal to a first threshold) when at least one characteristic identified during static scanning operations conducted on the file indicates a certain level of probability that the file includes malware. Similarly, the file may be classified with a second level (e.g. "malicious"—assigned a score greater than or equal to a second threshold greater than the first threshold) when at least one characteristic observed during static scanning operations conducted on the file indicates a certain greater level of probability that the file includes malware.

In particular, according to one embodiment of the disclosure, static scanning is conducted by static framework 175 within the first MCD system $110_1$, where the static framework 175 may be part of a scanning engine 170 for example. The static framework 175 is configured to conduct a first static scanning operation on a duplicated file extracted from the network traffic, and if no malware is detected, to further deconstruct the duplicated file to recover embedded objects. The file may be deconstructed by performing decompression, disassembly, decompilation, and/or other de-obfuscation operations thereon.

Thereafter, malware checks are conducted by the static framework 175 on one or more embedded objects within the file in order to potentially classify the file "malicious," depending on whether any object within the file is determined to have at least one characteristic associated with malware. In the event that, after deconstruction, an object is still inaccessible for static scanning, the static framework 175 is configured to emulate processing of the object under analysis within the context of simulated operations of an application associated with execution of the file. In other words, during emulation, both information exchanged with the object and information output from the object are analyzed to determine if such information has a certain level of correlation with one or more malware identifiers. The level of correlation (e.g., exact pattern match to matching a majority of the pattern) may be non-modifiable or may be adjustably set by an administrator.

The communication network 130 may include a public computer network such as the Internet, in which case an optional firewall 155 (represented by dashed lines) may be interposed between communication network 130 and client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap" or "network tap") that is configured to receive data traffic propagating to/from the client device 150 and provide content from the data traffic to the first MCD system $110_1$.

In general, the network interface 160 receives and duplicates the content that is received from and provided to client device 150 normally without an appreciable decline in performance by the server device 140, the client device 150, or the communication network 130. The network interface 160 may duplicate any portion of the content, for example, one or more files that are part of a data flow or part of the payload contained within certain data packets, or the like.

In some embodiments, the network interface 160 may capture metadata from network traffic intended for client device 150. This metadata may be used, at least in part, to deconstruct a corresponding file. For instance, the metadata may include keys that can be used to de-obfuscate the file.

It is contemplated that, for any embodiments where the first MCD system $110_1$ is implemented as an dedicated appliance or a dedicated computer system, the network interface 160 may include an assembly integrated into the appliance or computer system that includes network ports, network interface card and related logic (not shown) for connecting to the communication network 130 to non-disruptively "tap" data traffic propagating through firewall 155 and provide a copy of the data traffic to the scanning engine 170. In other embodiments, the network interface 160 can be integrated into an intermediary device in the communication path (e.g., firewall 155, router, switch or other network device) or can be a standalone component, such as an appropriate commercially available network tap. In virtual environments, a virtual tap (vTAP) can be used to duplicate files from virtual networks.

Referring still to FIG. 1, first MCD system $110_1$ may include a scanning engine 170, a heuristics database 175, a scheduler 180, a storage device 185, an analysis engine 190 and a reporting module 195. In some embodiments, the network interface 160 may be contained within the first MCD system $110_1$. Also, scanning engine 170, scheduler 180 and/or analysis engine 190 may be software modules executed by a processor that receives one or more files and performs a multi-tier static scan analysis on objects within the file(s), which may involve accessing one or more non-transitory storage mediums operating as database 175, storage device 185 and/or reporting module 195. In some embodiments, the scanning engine 170 may be one or more software modules at least partially forming static framework 175, where such software modules are executed by a processor. The scheduler 180 and the analysis engine 190 may be one or more software modules executed by the same or a different processor, where these different processors are possibly located at geographically remote locations, located within the same processor package (e.g. different processor cores) and/or communicatively coupled for example via a network.

In general, the scanning engine 170 performs static scanning of a file to determine whether objects within the file may include exploits (e.g. portions of content that may be exploited by malware), vulnerable functions, and/or malicious patterns (e.g. shell code patterns, ROP patterns, heap spray patterns, patterns to detect a malicious downloader, etc.). More specifically, as illustrated in FIG. 1, the scanning engine 170 receives a duplicated copy of one or more files associated with network traffic received from the network interface 160 and statically scans the content of the file(s) for malware identifiers. In other words, the scanning engine 170 performs a first static scan by comparing the contents of each file with malware and/or correlation between identifiers to determine an existence of malware which can be, but is not limited to exploit patterns, names of vulnerable functions, shell code patterns, heap spray patterns, etc. Alternatively, in in-line deployments, the network interface 160 may provide the original (rather than a duplicate) of the portion of content to the scanning engine 170 for malware analysis. While the balance of this specification may refer to the duplicate, this alternative embodiment may serve to implement the concepts later described herein.

If the comparison reveals a correlation between the contents of the file and one or more malware identifiers (hereinafter referred to as a "match"), which denotes a malicious event, the scanning engine 170 determines whether the corresponding file is "malicious" and assigns a score to the file. The malware checks applied by the scanning engine 170 may be based on data and/or rules stored in the heuristics database 175. Also, the scanning engine 170 may examine portions of the image associated with the one or more files without executing or opening such file(s).

If no malicious event is initially detected, the scanning engine 170 may further deconstruct the duplicated file to recover one or more embedded objects within the file. The deconstruction operations may include, but are not limited or restricted to decompression, disassembly, decompilation and/or other de-obfuscation of the file to obtain code-level access to the embedded object(s) within the file using for example de-obfuscation transformation techniques known to those of ordinary skill in the art. Thereafter, malware checks are conducted on the object(s) in order to determine if any of these objects may include exploits, vulnerable function calls, and/or malicious patterns, patterns to detect malicious downloaders, etc. As one illustrative embodiment, this may involve static scanning of code associated with the object for malware identifiers such as one or more malware exploit patterns, function patterns, and/or malicious patterns that are associated with malware.

Upon detecting a match, the scanning engine 170 may assign a score (e.g., an indicator of the likelihood of the analyzed file including malware) to the analyzed file. This may be performed in some embodiments by assigning a score to individual objects associated with a file, and then mathematically combining the object-level scores to obtain an overall score for the file. Thereafter, the file and score are routed from the scanning engine to the analysis engine 190 for use in further analysis to confirm the presence of malware within the file.

However, in the event that an object associated with the deconstructed file is still inaccessible for static scanning (e.g., code-level access of that object is still unavailable), the scanning engine 170 conducts emulation operations, where the processing of this object is emulated and an output associated with such emulation may be statically scanned to determine if portions of the output match any of the pre-stored malware identifiers. The emulation may be conducted in, for example, a "light weight" run-time environment for dynamic analysis. The run-time environment is described as "light weight" because it does not actually run applications that normally are used in processing files. The run-time environment may be provided with an emulated application selected based on the specific content being processed, however. For example, a PDF file may expect an Adobe® Reader™ application, and therefore, for emulation, the MCD system $110_1$ relies on an emulator to present certain simulated or virtualized features/responses associated with that application as expected by the file being analyzed. The MCD system $110_1$ then monitors behavior of the file within the emulator, for example, by intercepting or "hooking" any and all API calls, and comparing the hooked API calls with those expected of similar files when processed. Any unexpected API calls are regarded as anomalies that may indicate the file is malicious. The file is then assigned a score based on the presence or absence of such anomalies, and, in some embodiments, the type of the API call and/or other characteristics of the observed anomalies.

After static scanning, the file may be presented to the analysis engine 190 for more in-depth dynamic analysis using virtual machine technology for processing of the file in a more complete run-time environment in which one or more applications are executed (not just emulated). The ensuing processing may be conducted for a period of time that is either fixed or variable, and may be set manually by an administrator or automatically by the MCD system $110_1$, for example, based on the type of file, queue length of files to be analyzed, or other analysis parameters. For this purpose, the scanning engine 170 communicates with the scheduler 180.

The scheduler 180 may retrieve and configure a virtual machine (VM) to mimic the pertinent performance characteristics of the client device 150. In one example, the scheduler 180 may be adapted to configure the characteristics of the VM to mimic only those features of the client device 150 that are affected by the data traffic copied by the network interface 160. The scheduler 180 may determine the features of the client device 150 that are affected by the content by receiving and analyzing the network traffic from the network interface 160. Such features of the client device 150 may include ports that are to receive the content, certain device drivers that are to respond to the content, and any other devices coupled to or contained within the client device 150 that can respond to the content.

In another embodiment of the disclosure, the scanning engine 170 may determine the features of the client device 150 that are affected by the network traffic by receiving and analyzing the content from the network interface 160. The scanning engine 170 may then transmit the features of the client device to the scheduler 180 and/or analysis engine 190.

The analysis engine 190 is adapted to execute one or more VMs to simulate the receipt and/or execution of different "malicious" objects within a file under analysis (analyzed file) within a run-time environment as expected by the type of file, as noted above. The run-time environment may be one selected to mimic one that is prevalently provided by client devices, or, in alternative embodiments, one that can be provided by the client device 150 in particular. Furthermore, the analysis engine 190 analyzes the effects of such content upon the run-time environment, such as the client device 150. Such effects may include unusual network transmissions, unusual changes in performance, and the like. This detection process is referred to as a dynamic malicious content detection.

The analysis engine 190 may flag the malicious content as malware according to the observed behavior of the VM. The reporting module 195 may issue alerts indicating the presence of malware, and using pointers and other reference information to identify what message(s) (e.g. packet(s)) may contain malware. Additionally, the server device 140 may be added to a list of malicious network content providers, and future network transmissions originating from the server device 140 may be blocked from reaching their intended destinations, e.g., by firewall 155.

Of course, in lieu of or in addition to static scanning operations being conducted by MCD systems $110_1$-$110_N$, it is contemplated that cloud computing services 135 may be implemented to perform such static scanning: deconstruct a file for static scanning; conduct static scans on one or more objects within the deconstructed file(s); and/or perform emulation on any of these objects, as described herein. In accordance with this embodiment, MCD system 1101 may be adapted to establish secured communications with cloud computing services 135 for exchanging information.

Figure 2:
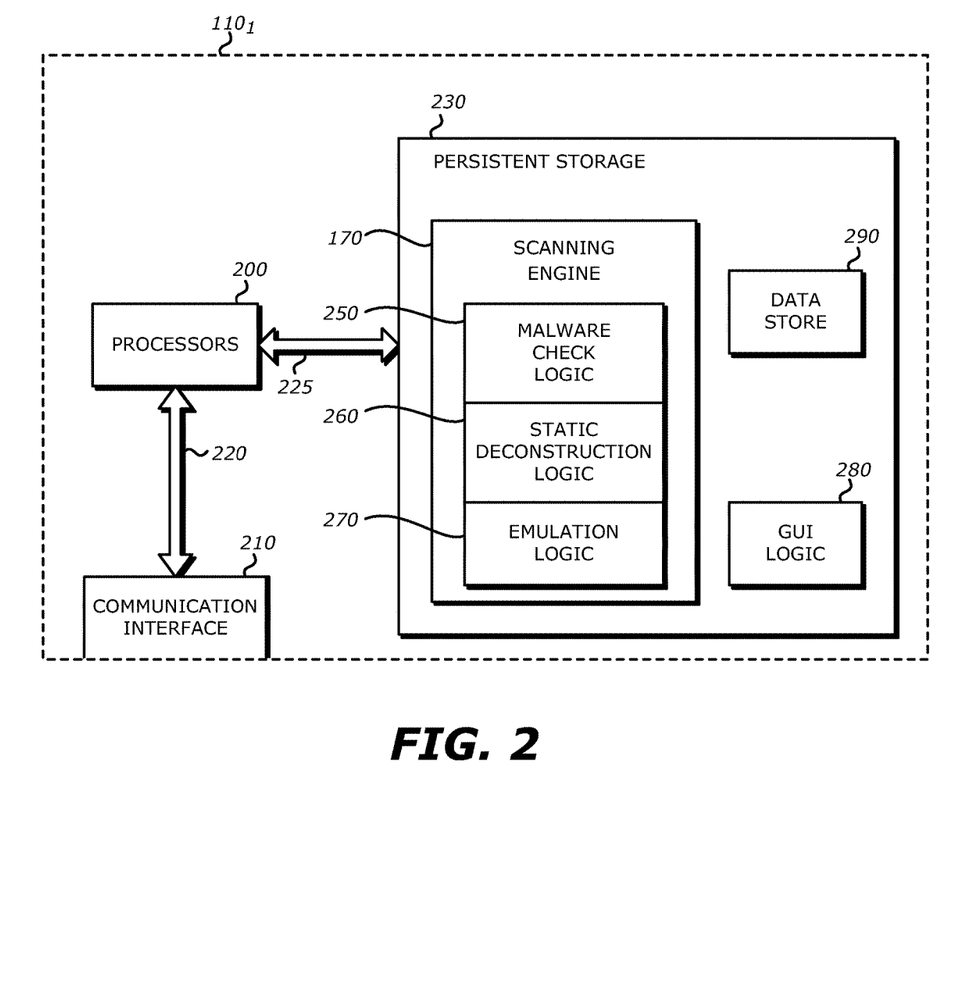
FIG. 2 is a detailed exemplary block diagram of logic associated with one of the MCD systems of FIG. 1.

Referring now to FIG. 2, an exemplary block diagram of logic associated with MCD system $110_1$ is shown. MCD system $110_1$ comprises one or more processors 200 that are coupled to communication interface logic 210 via a first transmission medium 220. Communication interface logic 210 enables communications with other MCD systems $110_2$-$110_N$ and management system 120 of FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor 200 is further coupled to persistent storage 230 via transmission medium 225. According to one embodiment of the disclosure, persistent storage 230 may include scanning engine 170, which comprises malware check logic 250, static deconstruction logic 260 and emulation logic 270. Of course, when implemented as hardware, logic 250, 260 and/or 270 would be implemented separately from persistent memory 230.

Malware check logic 250 comprises one or more software modules to conduct static scanning of content within a file to determine whether such content includes malware identifiers, such as information associated with known malware exploits. The malware check logic 250 may conduct, in some embodiments, a malware signature matching operation. As an example, malware check logic 250 may be initially invoked to conduct static scanning of content in the file, which includes conducting pattern comparison operations (e.g. bitwise comparison, byte-wise comparison, etc.) between accessible file content and malware identifiers associated with known exploit patterns, vulnerable functions and malicious patterns obtained from data store 290.

Subsequently, after failing to detect any malicious events and deconstructing the file as described herein, the malware check logic 250 may conduct a secondary static scan in which content within objects associated with the deconstructed file (e.g., code associated with one or more embedded objects within the file that is accessible after deconstructing of the file) is compared to the malware identifiers.

Static deconstruction logic 260 comprises one or more software modules that are invoked to deconstruct a file, namely perform decompression, disassembly, decompilation and/or de-obfuscation operations on the analyzed file. Such file deconstruction is to provide the malware check logic 250 with code-level (e.g., code can be pseudo code, assembly code or the native code in which the file was coded by the developer of the file) access to one or more objects within the analyzed file for subsequent static scanning operations as described above.

Emulation logic 270 (emulator) comprises one or more software modules that are invoked when the malware check logic 250 still fails to have code-level access for a targeted object within the analyzed file. Emulation logic 270 is configured to emulate operations of the object and, perhaps in combination with malware check logic 250, monitor for anomalous behavior. The monitoring may be accomplished by "hooking" certain functions associated with that object (e.g., one or more APIs, etc.) as described above, and controlling what data is specifically returned in response to corresponding function calls (e.g., force return of an application version number different than its actual number). After receipt of the returned data, operations by the object are monitored. For instance, the output from the object may be analyzed by the malware check logic 250 to determine if a portion of the output matches any of the malware identifiers. In some embodiments, the emulation logic 270 and/or the malware check logic 250 may access data store 290 for purposes of retrieving, from an API call repository, expected API calls typical of the type of file being processed, and may store "hooked" API calls therein for later reference.

Continuing the above example, in order to convey findings, processor(s) 200 may invoke GUI logic 280, which provides one or more screen displays for conveying a more detailed summary of malicious files being detected by MCD system 110₁. In some embodiments, the MCD system 110₁ may also contain remediation logic (not shown) to initiate remediation of identified malware and recovery from the identified exploit.

III. Exemplary Embodiments of Static Scanning

Figure 3:
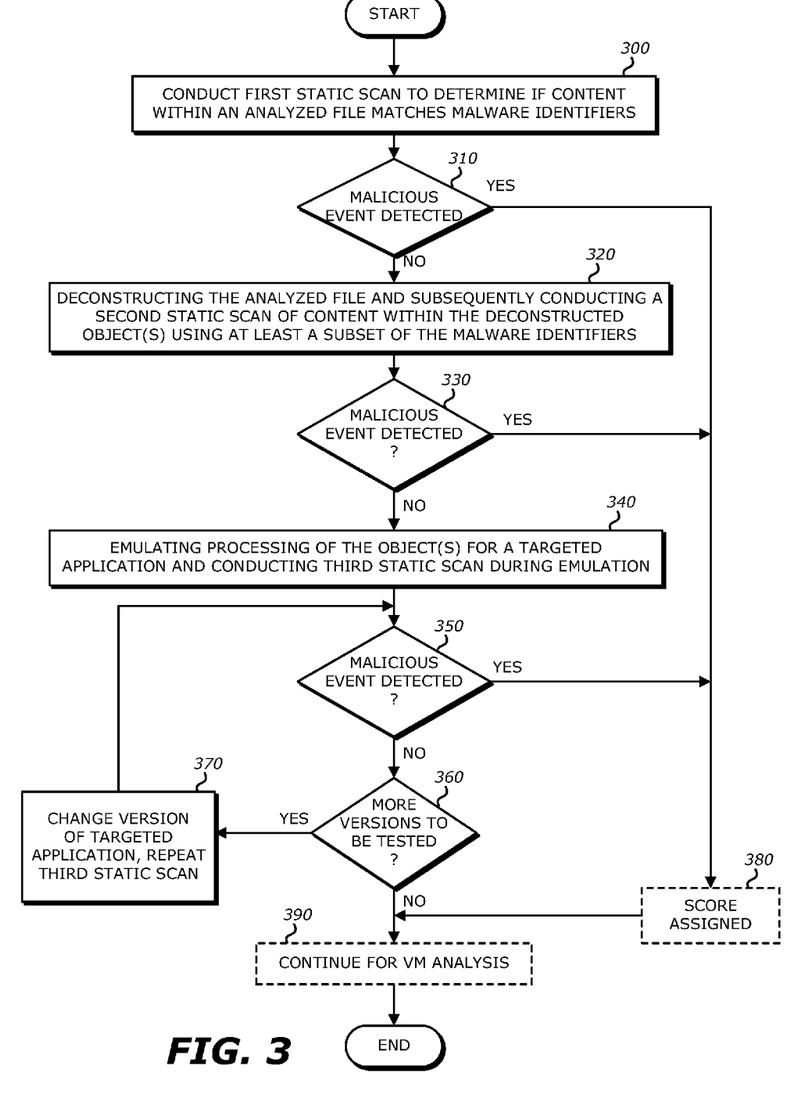
FIG. 3 is an exemplary block diagram of a flowchart illustrating multi-tier static scanning of content by logic within an electronic device within the communication system of FIG. 1.

Referring to FIG. 3, an exemplary diagram of a flowchart illustrating multi-tier static scanning of content (e.g., analyzed file) is shown. Herein, a first static scan is conducted to determine if content within an analyzed file has a certain level of correlation with (generally referred to as "matches") malware identifiers directed to predefined malware exploit patterns, vulnerable function calls, and/or malicious patterns such as shell code patterns, ROP patterns, heap spray patterns, or the like (block 300). If a malicious event is detected, it is contemplated that a score that identifies the likelihood of the presence of malware within the analyzed file may be produced and provided for use in subsequent VM-based analysis of the file (blocks 310, 380 and 390).

In the event that no malicious event is detected, the analyzed file is deconstructed (e.g., decompress, disassemble, decompile and/or de-obfuscate code within the analyzed file) to improve accessibility of one or more objects within the analyzed file. Then, a second static scan of the content of one of the deconstructed objects is conducted. According to one embodiment of the disclosure, the content of the object(s) is compared to at least a subset of the malware identifiers (block 320). If a match is detected to denote that a malicious event has been detected, a score that identifies the likelihood of the presence of malware within the deconstructed file may be produced and provided for subsequent VM-based analysis of the file (blocks 330, 380 and 390).

In the event that no malicious event is again detected, a third static scan is conducted after emulated processing of the object within the context of simulated operations associated with a targeted application (block 340). For example, when the file is a PDF file, the targeted application may be a certain version of an Adobe® Reader™ application and the emulation simulates operations that may occur if the Adobe® Reader application were actually or virtually being executed. One reason for such emulation is to detect malware exploits that are executed only upon detecting a certain version of the targeted application. If a malicious event is detected, a score that identifies the likelihood of the presence of malware within the analyzed file may be produced and provided for subsequent VM-based analysis of the content (blocks 350, 380 and 390).

If the malicious event is not detected, however, a determination is made as to whether further static analyses are to be conducted within the emulated environment for another version of the targeted application (block 360). Herein, the static analysis is associated with simulated operations of the targeted application, not operations associated with the targeted application being executed. This determination may be automatic, where all known versions of the targeted application are checked, or such determination may be manually set by an administrator to conduct checks only for certain versions of the targeted application. If further static scanning is to be conducted, processing of the file is emulated for a different version of the targeted application (block 370). If no further static scanning is to be conducted, the analyzed file (or portions of the analyzed file) is provided to analysis engine 190 of FIG. 1 for VM-based analysis.

Figure 4:
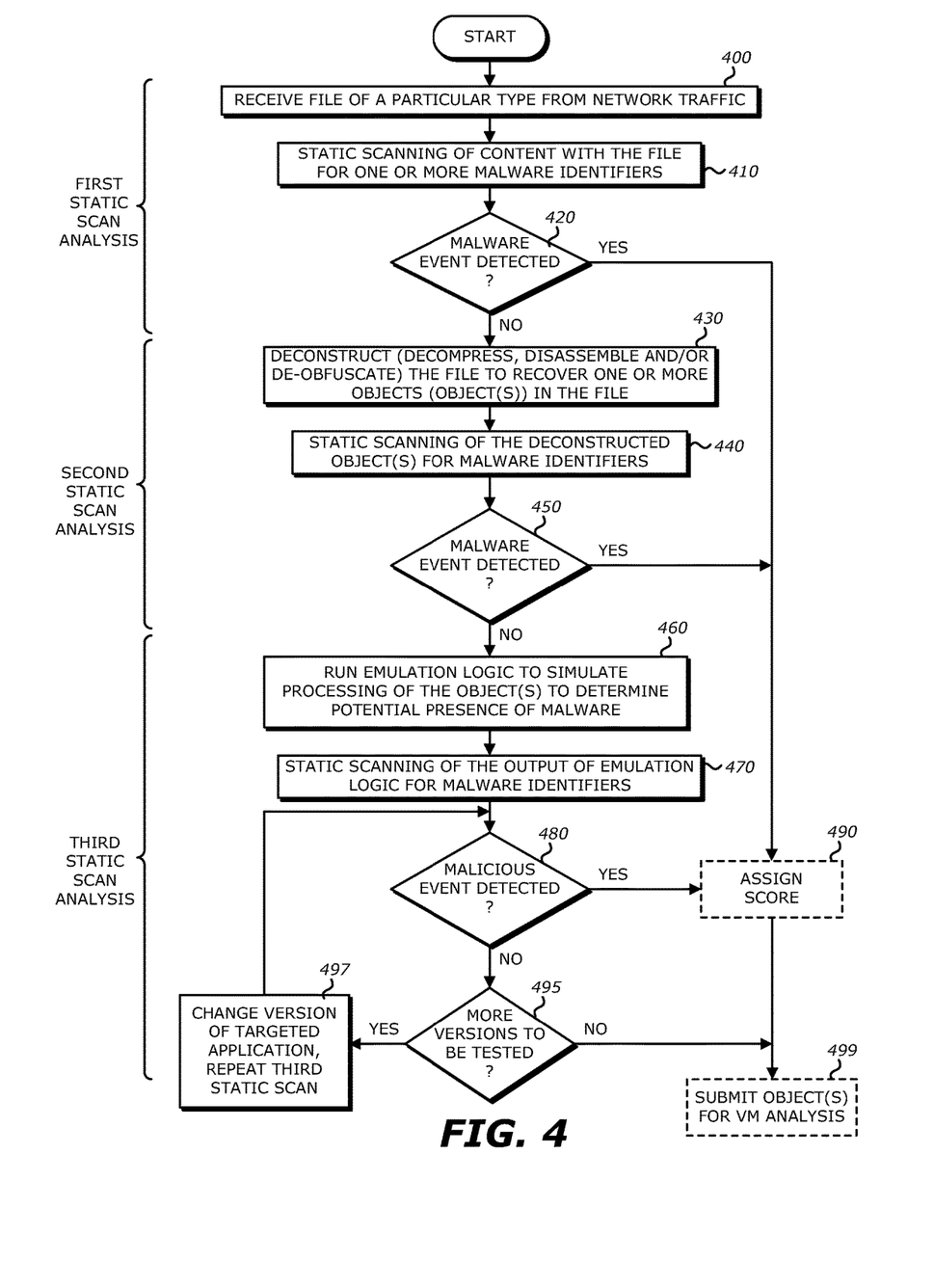
FIG. 4 is an exemplary block diagram of a flowchart illustrating details of the multi-tier static scan analyses set forth in FIG. 3.

Referring to FIG. 4, an exemplary diagram of a flowchart illustrating the multi-tier static scan analysis of FIG. 3 is shown. Herein, one or more files from network traffic routed over the communication network 130 of FIG. 1 are duplicated and provided to an electronic device (e.g., MCD system 110₁ of FIG. 1) that is adapted to perform the multi-tier static scan analysis (block 400). After the type of file has been determined, a first static scan analysis is conducted.

The first static scan analysis comprises statically scanning the content within the analyzed file. According to one embodiment of the disclosure, the content is compared to one or more pre-stored malware identifiers, which are associated with potential or known malware exploits (block 410). If a malicious event is detected, as an optional feature, a score that identifies the likelihood of the presence of malware within the analyzed file may be produced and assigned to the file prior to subsequent VM-based analysis of the content to confirm the presence of malware (blocks 420, 490 and 499).

In the event that no malicious event is detected, a second static scan analysis is conducted where the analyzed file undergoes deconstruction (e.g., decompress, disassemble, decompilation and/or de-obfuscate) to uncover one or more objects within the file and gain code-level access to these object(s) (block 430). Thereafter, these objects are statically scanned by subsequently comparing the contents to at least a subset of the pre-stored malware identifiers (block 440). If a malicious event is detected, a score that identifies the likelihood of the presence of malware within the deconstructed file may be produced and provided for subsequent VM-based analysis of the file (blocks 450, 490 and 499).

In the event that no malicious event is again detected, a third static scan analysis is conducted to emulate processing of the analyzed file by running emulation logic to simulate processing of the object(s) in order to determine if the analyzed file includes malware (block 460). Upon statically scanning the output from the emulation logic 270 (FIG. 2) for pre-stored malware identifiers, and if a match is determined thereby uncovering malicious activity, a score that identifies the likelihood of the presence of malware within the analyzed file may be produced and provided for subsequent VM-based analysis of the content (blocks 470, 480, 490 and 499). If the malicious event is not detected, the file (or particular object(s)) is provided for VM-based analysis (block 499).

It is contemplated that, during emulation, a determination may be made as to whether further static scanning is to be conducted on another version of the targeted application (block 495). If further static scanning is to be conducted, a different version of the targeted application is selected and processing of the file is emulated for that different version of the targeted application (block 497). If no further static scanning is to be conducted, the analyzed file (or portions of the analyzed file) is provided to analysis engine 190 of FIG. 1 for VM-based analysis (block 499).

In general, one inventive aspect is directed to a multi-tier static analysis that comprises deconstruction of the analyzed file and/or emulated processing of the analyzed file with results of the same being provided to the analysis engine 190 for subsequent VM-based analysis. This multi-tier static analysis is configured to improve accuracy and efficiency in malware analysis. As alternative embodiments, it is contemplated that any or all of the above-described static scan analyses may be conducted concurrently.

In some embodiments, based on a combination of the respective scores resulting from the static scans exceeding a threshold, the analyzed file may be classified as malicious, non-malicious, or, possibly, in need of further analysis, e.g., in VM-based analysis before classification may be made. It can be understood that, even if classified as a result of the static analysis, the file may be subjected to VM-based analysis to further identify characteristics and behaviors for use in later deterministic checks, for identifier comparison, for blocking, for remediation and for confirmation of static analysis results.

IV. Illustrative Static Scanning of PDF Files

Figure 5:
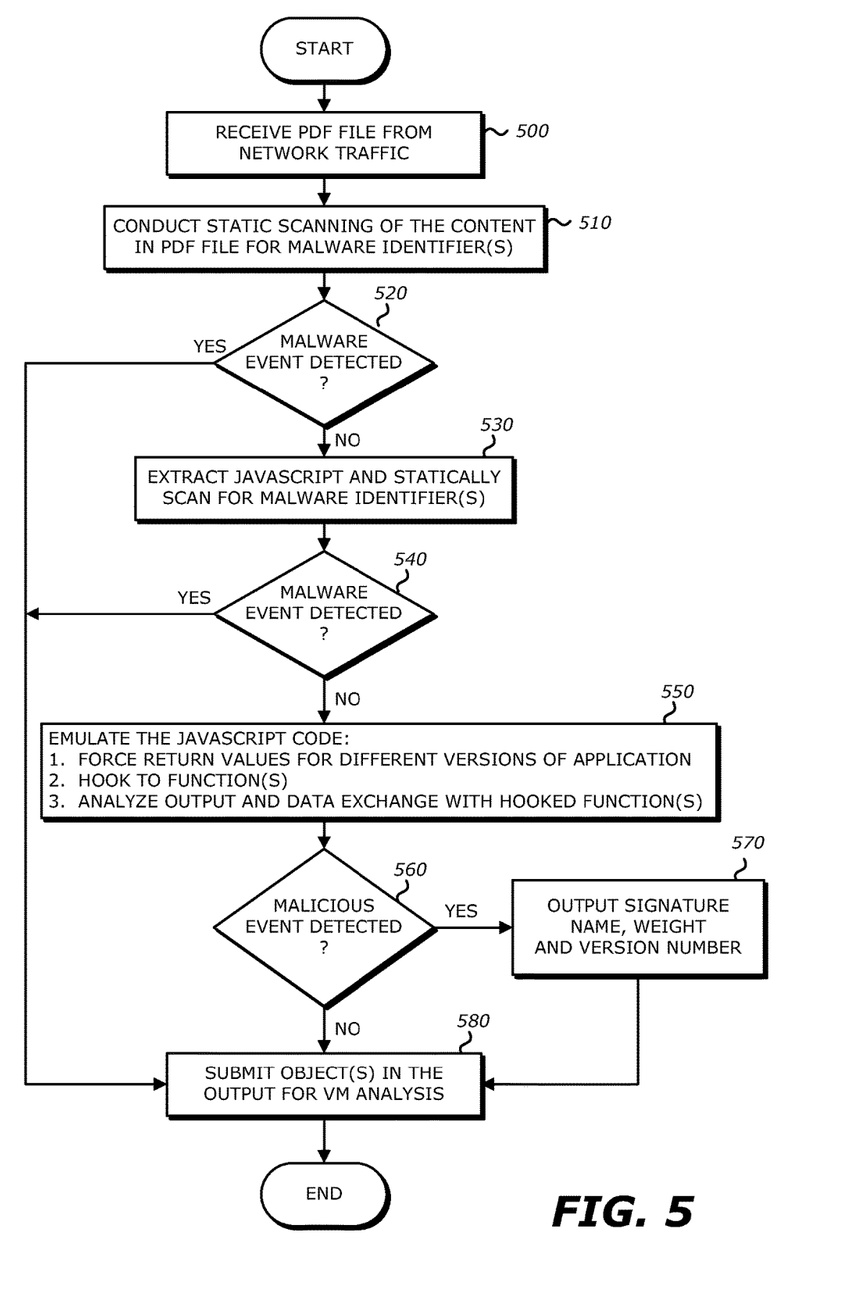
FIG. 5 is an exemplary block diagram of a flowchart partially illustrating operations for static scanning of PDF files in accordance with the multi-tier static scanning analyses of FIG. 4.

Referring to FIG. 5, an exemplary diagram of a flowchart partially illustrating operations for static scan analysis of PDF files is shown. Herein, one or more PDF files from network traffic routed over the communication network 130 of FIG. 1 is duplicated and provided to an electronic device (e.g., MCD system $110_1$ of FIG. 1) that is adapted to perform the multi-tier static scan analysis (block 500). After the "PDF" type has been determined, static scanning of the content of the PDF file is conducted, which may involve a pattern comparison or comparison of correlation of patterns between content within the analyzed file and one or more pre-stored malware identifiers and/or correlation logic to identify the file as malicious (block 510). If a malicious event is detected, the file (or one or more objects within the file) is provided for subsequent VM-based analysis to confirm the presence of malware (blocks 520 and 580). It is contemplated that, as an optional feature, a score that identifies the likelihood of the presence of malware within the analyzed file may be produced and assigned to the file (or the particular object under analysis).

If no malicious event is detected, the JavaScript® code is extracted from the PDF file. After extraction, the JavaScript® code is statically scanned for malware (block 530). Such static scanning may involve comparing portions of the code to certain malware identifiers. These malware identifiers may include known malware exploit patterns, vulnerable functions, and/or malicious patterns (e.g. shell code patterns, ROP patterns, heap spray patterns, etc.) and/or it may include correlation between the patterns in a file to determine malicious patterns which can be but not limited to shell code patterns, patterns to identify malicious downloader, etc. If a malicious event is detected, the file (along with the extracted JavaScript® code) is provided for subsequent VM-based analysis to confirm the presence of the malware exploit (blocks 540 and 580). Again, as an optional feature, a score that identifies the likelihood of the presence of malware within the file having the analyzed JavaScript® code may be produced and assigned accordingly.

In the event that no malicious event is detected, such as when the JavaScript® code itself is obfuscated, emulation of the JavaScript® code is conducted (block 550). During emulation, some of the functions (e.g. string evaluation functions, version check functions, timeout functions, vulnerable functions, etc.) associated with the JavaScript® code may be hooked. As a result, in response to a call to an Adobe® Reader™ application by any of these hooked functions for example, the emulation logic returns selected values in response to such calls. The returned values may allow for malware checks to be conducted on multiple versions of the emulated Adobe® Reader™ application.

For instance, as an illustrative example, in addition to providing a version number in case of emulation, the general processing of certain calls, such as Sleep calls for example, are disrupted by emulation. Basically, software "hooks" are applied to an API call responsible for making a Sleep call, and once this API is called, the MCD system $110_1$ provides selected values in response to the hooked Sleep call and monitors resulting outputs.

Also, in the event that the PDF file is dependent upon a particular version of Adobe® Reader™ application and this version number is returned, an output of the emulator will identify a code path associated with anomalous behavior that may be used to identify the JavaScript® code as malicious through a static scanning operation of the output or the data exchanged with the hooked functions. As a result, the hooking results in completing the emulated processing along with the output are used for classification of the file and/or JavaScript® code object as malicious.

If a malicious event is detected, the emulation logic routes the uncovered exploit name obtained from management system 120 (see FIG. 1), score, and version number of the Adobe® Reader™ application to the analysis engine for VM-based analysis (blocks 560-570). However, if a malicious event is still not detected, the file (or particular object(s)) is simply provided to the analysis engine for subsequent VM-based analysis (block 580).

V. Illustrative Static Scanning of Flash Files

Figure 6:
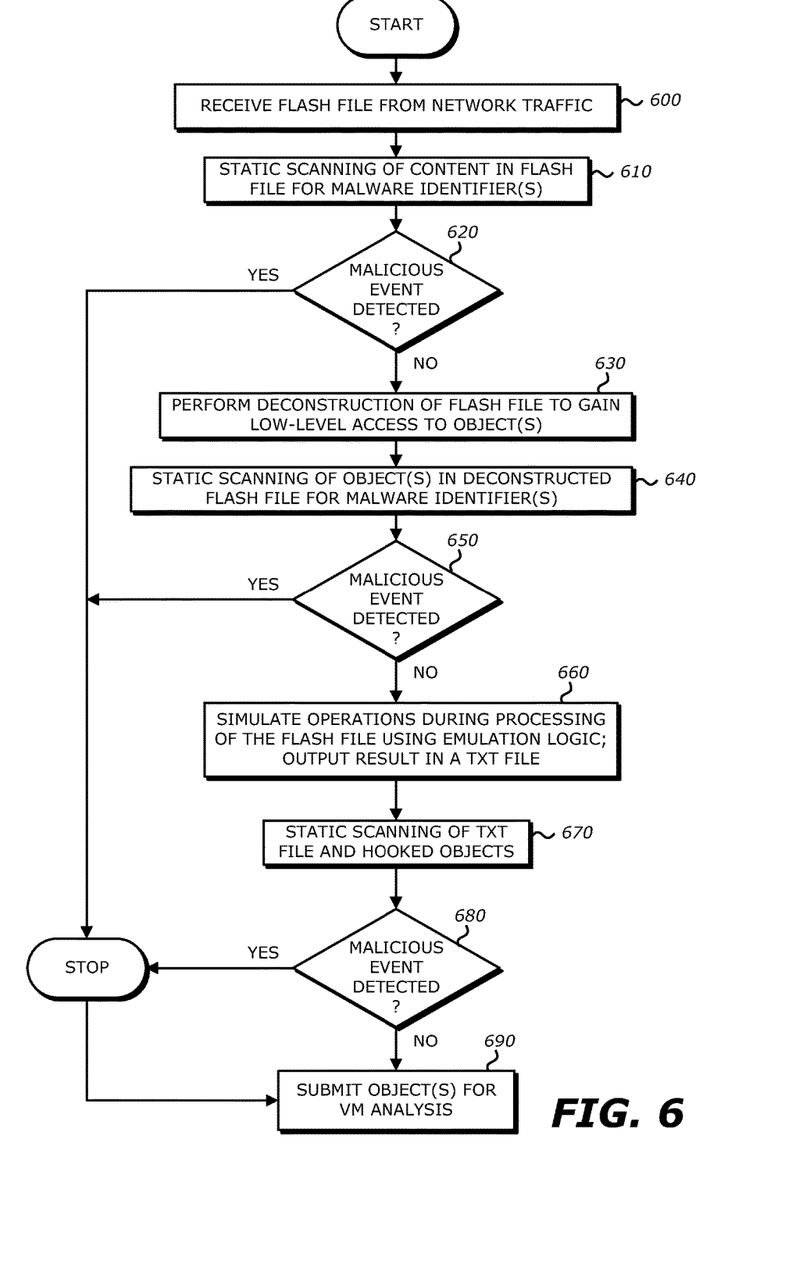
FIG. 6 is an exemplary block diagram of a flowchart partially illustrating operations for static scanning of Flash files in accordance with the multi-tier static scanning operations of FIG. 4.

Referring to FIG. 6, an exemplary diagram of a flowchart partially illustrating operations for static scan analysis of Flash files is shown. Herein, one or more Flash files from network traffic routed over the communication network 130 of FIG. 1 are duplicated and provided to an electronic device (e.g., MCD system $110_1$ of FIG. 1) that is adapted to perform the multi-tier static scan analysis (block 600). After the file is determined to be a "Flash" file, static scanning of content within the Flash file is conducted, which may include pattern comparison between one or more malware identifiers associated with potential or known malware attacks and content within the Flash file (block 610). If malicious event is detected, the Flash file (or one or more objects within the Flash file) is provided for subsequent VM-based analysis to confirm the presence of malware (blocks 620 and 690). It is contemplated that, as an optional feature, a score that identifies the likelihood of the presence of malware within the analyzed file may be produced and assigned to the particular Flash file (or object(s) associated with the Flash file).

If no malicious event is detected, the static deconstruction logic for Flash file types is invoked, which causes deconstruction of the Flash file (block 630). For instance, according to one embodiment of the disclosure, the Flash file may undergo decompression to detect embedded executable files. In combination with or in lieu of decompression, the deconstruction logic may disassemble and/or decompile the Flash file.

Thereafter, static scanning is conducted on the deconstructed file in order to detect the presence of malware (block 640). Such static scanning may involve comparing portions of the decompressed and/or disassembled Flash file to certain malware identifiers such as files with particular file extensions. If a malicious event is detected, the Flash file is provided for subsequent VM-based analysis to confirm the presence of the malware (blocks 650 and 690). Again, as an optional feature, a score that identifies the likelihood of the presence of malware within the Flash file may be produced and assigned accordingly.

In the event that no malicious event is detected, such as when portions of the Flash file are obfuscated (e.g., an embedded executable is encrypted), emulation of the Flash file is conducted where the Flash file code is processed (block 660). During emulation, for example, malware checks may be conducted which can be but are not limited to determining the presence of various malware exploits, such as embedded JavaScript® code or other embedded executables, or malicious HTTP requests. Also, certain functions associated with an uncovered JavaScript® code may be hooked. An output of the emulation logic is placed within a text (.txt) file, which undergoes a static scan for comparison and/or correlations between the patterns with malware identifiers, which can be but are not limited to exploit patterns, names of vulnerable functions, malicious patterns, or the like (block 670).

If a malicious event is detected, the emulation logic submits the Flash file to the analysis engine for further VM-based analysis (block 680). However, if the malicious event is still not detected, the Flash file (or particular object(s) within the Flash file) may be provided to the analysis engine for further VM-based analysis (block 690).

Accordingly, embodiments of the invention may perform one or more static scans to determine whether a file has malicious characteristics and/or behaviors. After each, the file may be declared malicious based on observed characteristics and/or behaviors and the resulting malware score. In some embodiments, following static scanning, the file may be submitted for more in-depth VM-based analysis. After a first static scan, if the file is not classified as malicious based on the score, the file may be deconstructed to provide access during a second static scan to objects embedded in or otherwise associated with the file whose access could not be had during the first static scan. After the second static scan, if the file is still not classified a malicious based the score, the file is submitted for emulation and then subjected to a third static scan. Of course, at any step during this process, if the malware score is sufficiently low, the file may be classified as non-malicious and analysis may be terminated. In some embodiments, termination does not occur, however, prior to VM-based testing regardless of the value of the score for reasons discussed hereinabove.

As briefly described above, each of the static scan analyses (or portions thereof) and the virtual execution environment may be conducted within the enterprise network and/or externally through cloud services. For instance, as illustrative examples, the static scans, file deconstruction and emulation may be performed at the enterprise network. Alternatively, the static scans and file deconstruction may be performed at the enterprise network, but emulation is conducted in the cloud. As another alternative, the static scans and the emulation may be performed at the enterprise network while the file deconstruction is conducted in the cloud. As yet another alternative, the file deconstruction and/or emulation may be performed at the enterprise network, but the static scans may be conducted in the cloud. As yet other alternatives, the first, second and/or third static scan analyses may be performed at either the enterprise network or the cloud, e.g. first and second static scan analyses may be performed at the enterprise network while the third static scan analysis is performed in the cloud. For all of these illustrative examples, virtual execution may be conducted in the enterprise network (e.g. by the MCD system) or may be conducted in the cloud.

It is further contemplated that the same general logic and operations as described for Flash files are applicable to JAVA® Archive (JAR) files. For instance, a JAR file is decompiled into JAVA® code on which checks are applied to determine if a file is malicious.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system comprising:
   a non-transitory computer-readable medium to store information; and
   a processor communicatively coupled to the non-transitory computer-readable medium, the processor for processing the stored information to:
   (i) prior to deconstructing a file, performing a first static scan to determine if content within the file has a prescribed level of correlation with one or more malware identifiers;
   (ii) when the content does not have at least the predefined level of correlation with the one or more malware identifiers, deconstruct the file to gain access to an object within the file, and thereafter, perform a second static scan to analyze the object to determine whether the object is suspected of including malware and classify the file with a score indicating a likelihood that the file includes malware when the object is suspected of including malware, and
   (iii) when the object remains inaccessible for purposes of performing the second static scan following deconstruction of the file, emulate processing of the object and perform a third static scan on both (1) information provided to the object during emulation and (2) information produced by the object during emulation.

2. The system of claim 1, wherein the processor deconstructing the file comprises decompressing the file to gain access to the object and the second static scan comprises comparing content within the object to one or more malware identifiers.

3. The system of claim 1, wherein the processor deconstructing the file comprises disassembling the file by converting executable code associated with the object into a readable format and the second static scan comprises comparing the readable format to one or more malware identifiers.

4. The system of claim 3, wherein the executable code comprises object code and the readable format comprises one of assembly language and JavaScript® code.

5. The system of claim 1, wherein the processor deconstructing the file comprises decompiling the file in order to gain access to the object and the second static scan comprises comparing content within the object to one or more malware identifiers.

6. The system of claim 5, wherein the one or more malware identifiers include at least one of a pattern associated with an exploit, a name of a vulnerable function that are known to be susceptible to exploits, and a malicious pattern that denotes malicious replication of data.

7. The system of claim 1, wherein the processor emulates processing of the object by intercepting Application Programming Interface (API) messages initiated by the object and controlling values returned to the object.

8. The system of claim 1, wherein the processor further processes information associated with one or more virtual machines that are configured to conduct subsequent virtual execution of the object and analyze whether any anomalous behavior is detected during the virtual execution of the object after conducting at least one of the first static scan, the second static scan and the third static scan.

9. The system of claim 1, wherein the processor performing the second static scan by comparing content associated with the object of the deconstructed file with one or more malware identifiers, the one or more malware identifiers including at least one of a pattern associated with an exploit, a name of a vulnerable function that are known to be susceptible to exploits, and a malicious pattern that denotes malicious replication of data.

10. The system of claim 1, wherein the processor performing the third static scan when the object associated with the deconstructed file is inaccessible after conducting the second static scan.

11. The system of claim 1, wherein:
the non-transitory computer-readable medium to store the information including malware check logic and emulation logic; and the processor to execute (i) the emulation logic to emulate processing of the object, being a portion of a file under analysis, by an emulated first version of an application, and (ii) the malware check logic to (a) conduct the third static scan on information associated with the emulated processing of the object and (b) classify the file with a score indicating a likelihood that the file includes malware if the object is suspected of including malware,
wherein the processor further repeating the emulated processing of the object in accordance with an emulated second version of the application for conducting a subsequent static scan to determine a second score indicating a second likelihood that the file includes malware.

12. The system of claim 11, wherein prior to executing the emulation logic, the processor executing deconstruction logic to deconstruct the file to gain access to the object within the file, and thereafter, execute the malware check logic to conduct the second static scan analysis of the object to determine whether the object is suspected of including malware and classify the file as malicious if the object is suspected of including malware.

13. The system of claim 11, wherein the processor repeats the emulated processing when the third static scan conducted by the processor failed to classify the file as malicious.

14. The system of claim 11, wherein the information associated with the emulated processing comprises at least one of hooked Application Programming Interface (API) calls and an output from the emulation logic.

15. The system of claim 1, wherein the processor deconstructing the file comprises de-obfuscating the file by conducting at least one of decoding content with the file, decrypting content within the file, unpacking content within the file, and removing any protection mechanisms for the file.

16. The system of claim 1, wherein the processor deconstructing the file comprises decompiling the file by conveying at least one of (1) an executable code being the object into one of a pseudo code and a native code, (2) a Flash code being the object into action script code, and (3) an JAVA® Archive "JAR" file being the object into one or more JAVA® files.

17. The system of claim 1, wherein the processing of the stored information is performed using cloud computing services, wherein the cloud computing services may include one or more of a public network or a private network.

18. The system of claim 17, wherein malware identification is transmitted between the system and a second malware content detection system according to a subscription basis.

19. A computerized method comprising:
storing, in a non-transitory computer-readable medium, information including a file being a collection of data;
prior to deconstructing the file, performing a first static scan to determine if content within the file has a prescribed level of correlation with one or more malware identifiers;
deconstructing the file to gain access to an object within the file;
performing a second static scan to analyze the object to determine whether the object is suspected of including malware and classify the file with a score indicating a likelihood that the file includes malware if the object is suspected of including malware; and
when the object remains inaccessible for purposes of performing the second static scan following deconstruction of the file, emulating processing of the object and performing a third static scan on both (1) information provided to the object during emulation and (2) information produced by the object during emulation.

20. The method of claim 19, wherein the deconstructing of the file comprises decompressing the file to gain access to the object and the second static scan comprises comparing content within the object to one or more malware identifiers.

21. The method of claim 19, wherein the deconstructing of the file comprises disassembling the file by converting executable code associated with the object into a readable format and the second static scan comprises comparing the readable format to one or more malware identifiers.

22. The method of claim 19, wherein emulation of the processing of the object is performed using cloud computing services, wherein the cloud computing services may include one or more of a public network or a private network.

23. The method of claim 22, wherein malware identification is transmitted between the system and a second malware content detection system according to a subscription basis.

* * * * *